US010365892B2

(12) United States Patent
Carlough et al.

(10) Patent No.: US 10,365,892 B2
(45) Date of Patent: Jul. 30, 2019

(54) DECIMAL FLOATING POINT INSTRUCTIONS TO PERFORM DIRECTLY ON COMPRESSED DECIMAL FLOATING POINT DATA

(71) Applicant: INTERNATIONAL BUSINESS MACHINES CORPORATION, Armonk, NY (US)

(72) Inventors: Steven R. Carlough, Poughkeepsie, NY (US); Petra Leber, Ehningen (DE); Silvia Melitta Mueller, Altdorf (DE); Kerstin Schelm, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 74 days.

(21) Appl. No.: 15/406,818

(22) Filed: Jan. 16, 2017

(65) Prior Publication Data

US 2018/0203670 A1 Jul. 19, 2018

(51) Int. Cl.
*G06F 7/491* (2006.01)
*G06F 7/499* (2006.01)

(52) U.S. Cl.
CPC ............ *G06F 7/4991* (2013.01); *G06F 7/491* (2013.01); *G06F 2207/4911* (2013.01)

(58) Field of Classification Search
CPC ................ H03M 7/24; G06F 2207/491; G06F 2207/4911; G06F 7/06
USPC .................................. 708/204, 495; 712/222
See application file for complete search history.

(56) References Cited

U.S. PATENT DOCUMENTS 7,051,060 B2 5/2006 Ford
8,082,282 B2 * 12/2011 Lundvall ................ G06F 7/491 708/204
2006/0179098 A1 * 8/2006 Kelly ........................ G06F 7/74 708/495
2007/0277022 A1 * 11/2007 Bohizic .............. G06F 11/2226 712/222
2014/0181481 A1 * 6/2014 Cowlishaw ............ G06F 7/491 712/222
2015/0039661 A1 2/2015 Blomgren et al.
(Continued)

FOREIGN PATENT DOCUMENTS

WO WO0041069 A1 7/2000

OTHER PUBLICATIONS

Mel, Peter and Tim Grance, "The NIST Definition of Cloud Computing," National Institute of Standards and Technology, Information Technology Laboratory, Special Publication 800-145, Sep. 2011, pp. 1-7.

(Continued)

*Primary Examiner* — Andrew Caldwell
*Assistant Examiner* — Emily E Larocque
(74) *Attorney, Agent, or Firm* — Margaret McNamara, Esq.; Kevin P. Radigan, Esq.; Heslin Rothenburg Farley & Mesiti P.C.

(57) ABSTRACT

Processing within a computing environment is facilitated. An operand of an instruction is obtained, which includes decimal floating point data encoded in a compressed format. An operation is performed on the operand absent decompressing a source value of a trailing significand of the decimal floating point data in the compressed format.

20 Claims, 16 Drawing Sheets

(56) References Cited

U.S. PATENT DOCUMENTS

2016/0098249 A1 4/2016 Carlough et al.

OTHER PUBLICATIONS

IBM, "z/Architecture—Principles of Operation," IBM Publication No. SA22-7832-10, Eleventh Edition, Mar. 2015, pp. 1-1732.
IBM, "PowerISA—V2.07B," Apr. 9, 2015, pp. 1-1527.
"IEEE Standard for Floating-Point Arithmetic," IDEEE Std 754-2008IEEE Computer Society, Aug. 29, 2008, pp. 1.
Wang, L.K. et al., "A Survey of Hardware Designs for Decimal Arithmetic," IBM Journal of Research and Development, vol. 54, No. 2, Paper 8, Mar./Apr. 2010, pp. 8:1-8:15.

* cited by examiner 300 302 304 306 308

| FORMAT | | SIGN (BIT) | TYPE (BIT) | EXPONENT (BIT) | SIGNIFICAND | |
|---|---|---|---|---|---|---|
| | | | | | T (DPD) | FULL (BCD) |
| DEC32 | 32b | 1 | 5 | 6 → 8 | 20b | 7d (28b) |
| DEC64 | 64b | 1 | 5 | 8 → 10 | 50b | 16d (64b) |
| DEC128 | 128b | 1 | 5 | 12 → 14 | 110b | 34d (136b) |

400 402 404 413 412 414

| COMBO FIELD (0:5) | | | | | | |
|---|---|---|---|---|---|---|
| TYPE(0:4) | | | E(0) | DATA TYPE | EXPONENT MSE | SIGNIFICAND MSD |
| 11 | 11 | 1 | 1 | SNaN | -- | 0000 |
| | | 1 | 0 | QNaN | -- | |
| | | 0 | * | INFINITY | -- | |
| | 10 | X | * | NUMBER WITH MOST SIGNIFICANT DIGIT MSD = 8, 9 | 10 | 100X |
| | 01 | X | * | | 01 | |
| | 00 | X | * | | 00 | |
| 10 | abx | | * | NUMBER WITH MOST SIGNIFICANT DIGIT MSD = 0,..., 7 | 10 | 0ABX |
| 01 | abx | | * | | 01 | |
| 00 | abx | | * | | 00 | |

FIG. 4B

DECIMAL FLOATING POINT INSTRUCTIONS TO PERFORM DIRECTLY ON COMPRESSED DECIMAL FLOATING POINT DATA

BACKGROUND

One or more aspects relate, in general, to facilitating processing within a computing environment, and in particular, to facilitating processing associated with decimal floating point operations.

Data may be represented in computing storage in many different formats, including a decimal floating point (DFP) format. Decimal floating point data may be represented in a plurality of different formats, including, e.g., a 128-bit quad precision format including 34 compressed binary coded decimal (BCD) digits of data, a 64-bit double precision format including 16 digits of compressed binary coded decimal data, and a 32-bit single precision format including 7 digits of compressed binary coded decimal data.

For decimal floating point operations, the operands of the operations exist in an encoded format, referred to as a densely packed decimal (DPD) encoding. With this encoding, the data is decompressed into binary coded decimal digits for processing operations, and then, recompressed into densely packed decimal data when processing is complete. Each group of 12 bits of binary coded decimal data is encoded into 10 bits of densely packed decimal data known as a declet. Though the dense format allows an increase in the number of binary coded decimal digits that can be stored in the format, decompression and recompression is required. This impacts system processing and performance.

SUMMARY

Shortcomings of the prior art are overcome and additional advantages are provided through the provision of a computer system to facilitate processing in a computing environment. The computer system includes a memory; and a processor in communication with the memory, and wherein the computer system is configured to perform a method. The method includes obtaining an operand of an instruction, the operand including decimal floating point data encoded in a compressed format; and performing an operation on the operand absent decompressing a source value of a trailing significand of the decimal floating point data encoded in the compressed format.

Methods and computer program products relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 4B depicts one example of decoding a combination field of a decimal floating point number, in accordance with an aspect of the present invention;

DETAILED DESCRIPTION

In accordance with one or more aspects, a capability is provided to facilitate processing and improve system performance within a computing or processing environment by eliminating selected decompression/compression operations (also referred to as unpack/pack operations) for certain decimal floating point operations. By not performing the decompression/compression, and instead, operating directly on the compressed densely packed decimal data, the latency of certain decimal floating point operations is improved. Further, if decompression/compression of the data is not necessary for certain operations, those operations may be moved to shorter execution pipelines, which further improves performance and saves power.

One embodiment of a computing environment to incorporate and use one or more aspects of the present invention is described with reference to FIG. 1. In one example, the computing environment is based on the z/Architecture, offered by International Business Machines Corporation, Armonk, N.Y. One embodiment of the z/Architecture is described in "z/Architecture Principles of Operation," IBM Publication No. SA22-7832-10, March 2015, which is hereby incorporated herein by reference in its entirety. Z/ARCHITECTURE is a registered trademark of International Business Machines Corporation, Armonk, N.Y., USA.

In another example, the computing environment is based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

The computing environment may also be based on other architectures, including, but not limited to, the Intel x86 architectures. Other examples also exist.

Figure 1:
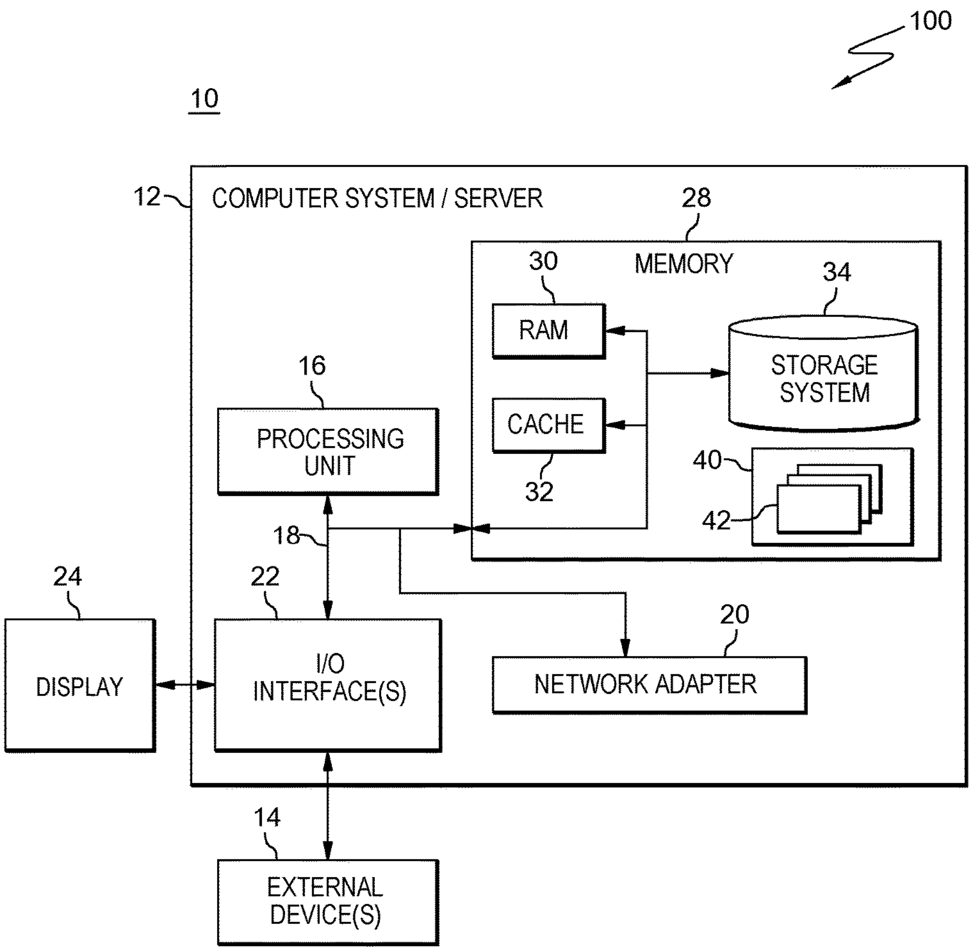
FIG. 1 depicts one example of a computing environment to incorporate and use one or more aspects of the present invention.

As shown in FIG. 1, a computing environment 100 includes a compute node 10, which includes a computer system/server 12, which may include, but is not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Processors typically have a plurality of execution pipelines operating, e.g., in parallel, that are used for various processing. For example, a decimal floating point pipeline is used to process decimal floating point operations, while a SIMD (single instruction, multiple data) or vector pipeline is used to process vector operations. A decimal floating point pipeline is typically a long pipeline, since it takes about 9-10 processing cycles to perform a decimal floating point operation. This is due in part to the decompression/compression operations that are performed.

Figure 2:
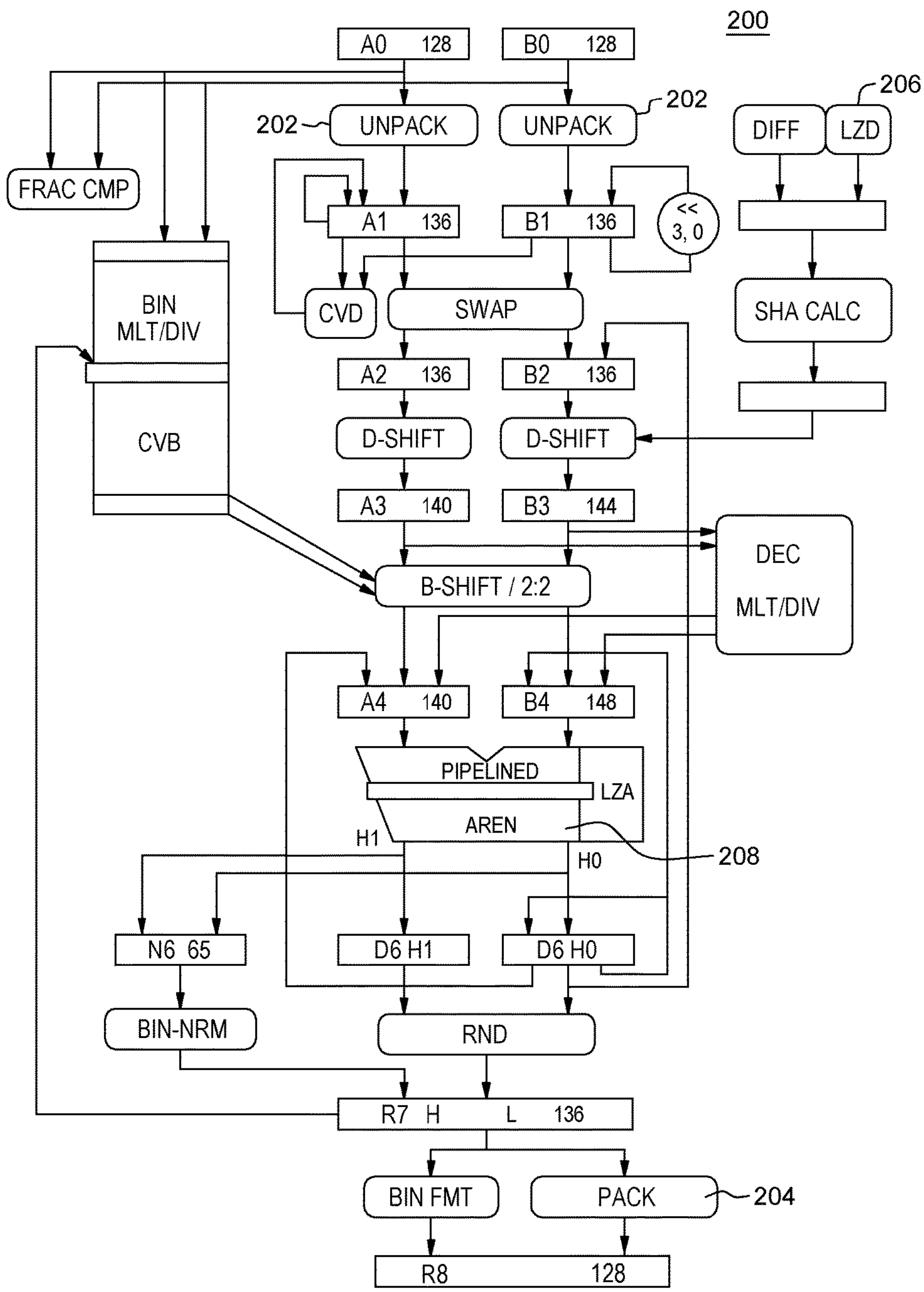
FIG. 2 depicts one example of a pipeline of a decimal floating point unit.

As shown in FIG. 2, an example pipeline 200 of a Decimal Floating Point Unit (DFU) includes, for instance, a plurality of decompressors (e.g., unpack logic 202) and a compressor (e.g., pack logic 204). The depth of the overall DFU pipeline 200 is 9 cycles, in this example. Although these instructions employ a small amount of detection logic (currently existing in LZD (leading zero detection) 206 and AREN (arithmetic engine) 208 macros), their latency is 9 cycles long because they traverse the full DFU pipeline to complete. The DFU is the only unit in the core, in one implementation, with the decompressors and compressor for processing these operands. Furthermore, these instructions do very little as they flow through the deep DFU pipeline resulting in a significant number of latches clocking for no other purpose than to have the instruction flow down the pipe.

In contrast, a SIMD or vector pipeline is shorter and includes about 3 processing cycles, since decompression/ compression is not used for its operations. Processing speed is increased by using shorter execution pipelines.

Figures 3, 4A:
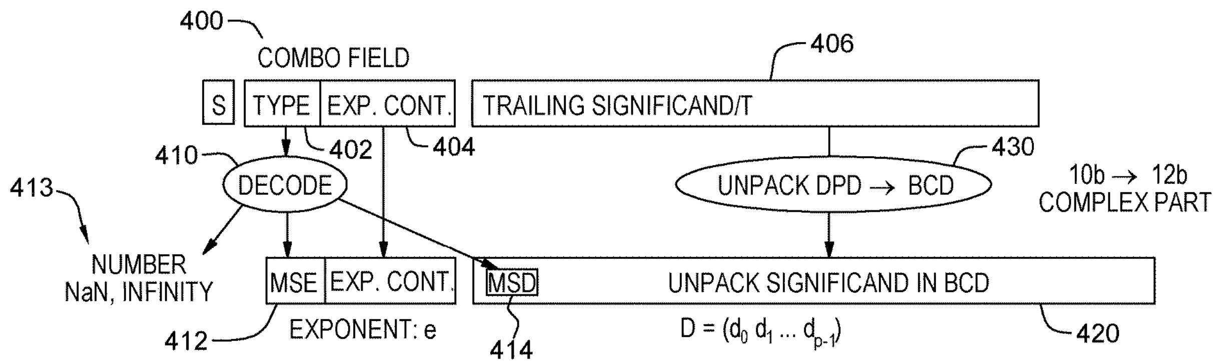
FIG. 3 depicts examples of formats of decimal floating point numbers, in accordance with an aspect of the present invention.
FIG. 4A depicts one example of decoding a decimal floating point number, including unpacking the trailing significand of a decimal floating point number.

Therefore, in accordance with an aspect of the present invention, a subset of decimal floating point instructions is implemented, in which the instructions perform directly on the decimal floating point data without requiring decompression/compression. In particular, one aspect of the invention removes the need for using the unpack and pack logic for execution of the instructions included in the subset of DFP instructions, allowing them to be executed in a shorter pipeline (e.g., like a 3-cycle deep vector pipeline) with a small amount of additional logic; thereby, improving performance and reducing power consumption. These instructions include, for instance, Load Lengthened (also may be referred to as Load Extended), Load and Test, Test Data Class and Test Data Group. Details of each of the instructions are described further below. However, since each of the instructions operates on decimal floating point numbers, initially, details relating to decimal floating point numbers are provided. As shown in FIG. 3, a decimal floating point number may have a plurality of formats 300, including, for instance, 32, 64 and 128 bit formats, and each format has a representation that includes, for instance, a sign 302, a type 304, an exponent 306 and a significand 308.

Decimal floating point numbers are often encoded in a densely packed decimal (DPD) format to save space, and then, converted to another format, such as binary coded decimal (BCD) to be operated on. One example of converting a decimal floating point number is described with reference to FIGS. 4A-4B. As shown in FIG. 4A, both a combination (combo) field 400, which includes a type 402 and an exponent continuation 404; and a trailing significand (T) field 406 of a decimal floating point number are converted. Combo field 400 is decoded 410 to determine a most significant exponent (MSE) 412 of the exponent, a type 413 of the operand (e.g., number, NaN (not-a-number), infinity), and a most significant digit (MSD) 414 of an unpacked significand 420. For instance, as shown in FIG. 4B, the values of five bits (e.g., bits 0-4) of type 402 and one bit (e.g., bit 0) of exponent 404 provide a value of most significant exponent 412, type 413 and a value of most significant digit 414.

Further, returning to FIG. 4A, trailing significand (T) 406 is unpacked 430 to provide unpacked significand 420. In one example, the unpacking is from DPD to BCD (binary coded decimal), in which each declet, or group of 10 bits of DPD data, is unpacked into 12 bits of BCD data. This unpacking is depicted in FIG. 4C.

Figure 4C:
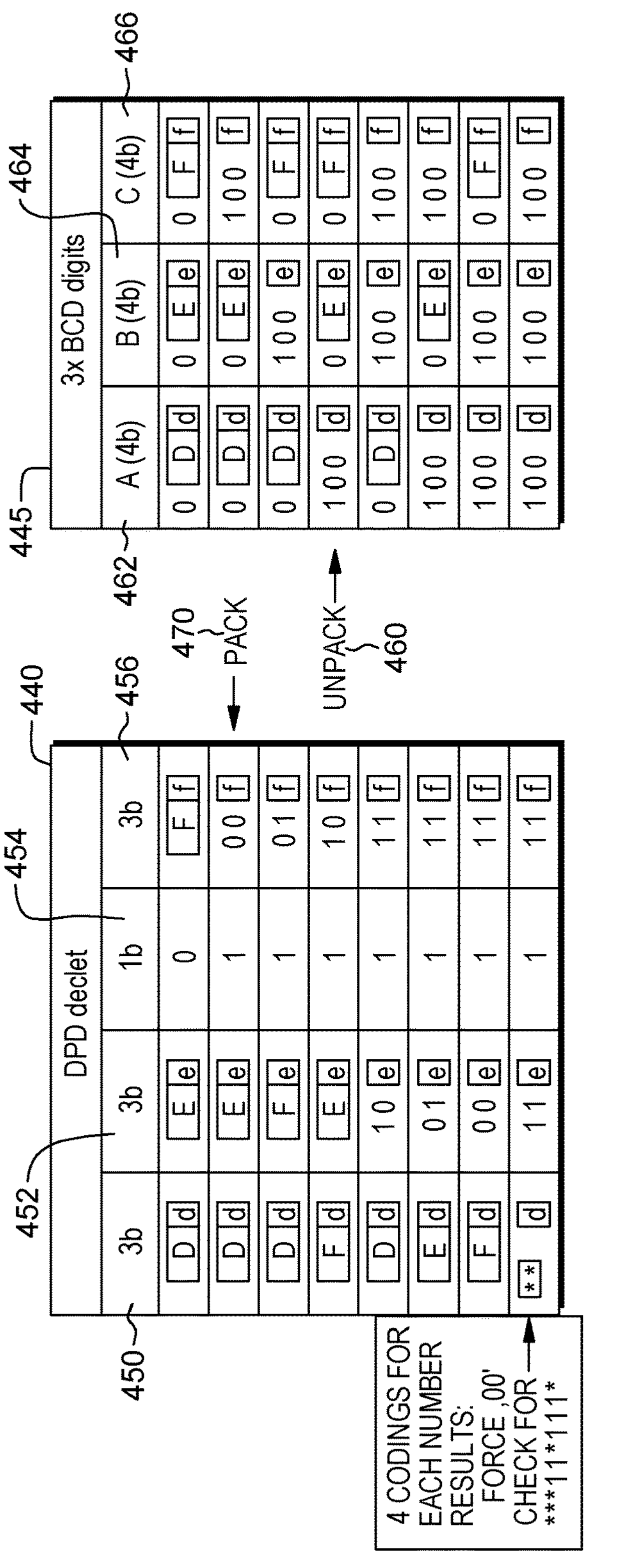
FIG. 4C depicts encoding 12 bits of binary coded decimal (BCD) digits into a 10-bit densely packed decimal (DPD) declet.

Referring to FIG. 4C, as shown, a 10 bit group of DPD data (also referred to as a declet) 440 has 10 bits: 3 bits 450, 3 bits 452, 1 bit 454 and 3 bits 456. Those 10 bits are unpacked 460 into 12 BCD digits 445: 4 bits 462, 4 bits 464, and 4 bits 466. Conversely, the 12 BCD digits may be packed 470 into 10 DPD digits. This conversion process is part of, e.g., the IEEE (Institute of Electrical and Electronics Engineers) 754 Standard.

Typically, decimal floating point instructions perform processing on the converted number, including the unpacked significand. However, in accordance with an aspect of the present invention, the unpacking of the trailing significand no longer is to be performed for the subset of instructions, including, for instance, the Load Lengthened, Load and Test, Test Data Class and Test Data Group instructions, each of which is described below.

Figure 5A:
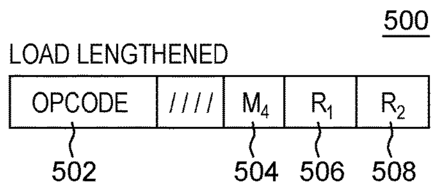
FIG. 5A depicts one example of a format of a Load Lengthened instruction, in accordance with an aspect of the present invention.

One example of a Load Lengthened instruction is described with reference to FIG. 5A. In one example, a Load Lengthened instruction 500 includes an opcode 502 to specify a load lengthened operation, a mask field ($M_4$) 504, a first register field ($R_1$) 506, and a second register field ($R_2$) 508. In one example, two opcodes may be specified: one indicating a short DFP source, long DFP result (LDETR), and another indicating a long DFP source, extended DFP result (LXDTR).

In operation, the second operand (e.g., contents of the register specified by $R_2$) is converted to a longer format, and the result is placed at the first operand location (e.g., address specified in the register specified by $R_1$).

Bit 0 of the $M_4$ field controls the handling of SNaN (Signaling Not-a-Number) and infinity, and is called the IEEE invalid operation exception control (XiC). Bits 1-3 are ignored, in this example. When XiC is zero, recognition of an IEEE invalid operation exception is not suppressed; when XiC is one, recognition of the exception is suppressed.

When the second operand is a finite number, the value of the second operand is placed in the target format.

When the second operand is an infinity, if XiC is zero, the result is the canonical infinity for the target format (canonical means chosen, selected or preferred); if XiC is one, the result is the source infinity with the reserved field of the target format being set to zero, the trailing significand being extended by appending zeros on the left, and all declets (10 bits) in the encoded trailing significand field being canonicalized.

When the second operand is a QNaN (Quiet Not-a-Number), the result is the canonicalized source QNaN with the payload extended by appending zeros on the left.

When the second operand is an SNaN, if XiC is zero, an invalid operation exception is recognized and the nontrap result is the corresponding QNaN with the payload extended by appending zeros on the left; if XiC is one, no invalid operation exception is recognized, and the result is the canonicalized source SNaN with the payload extended by appending zeros on the left.

The sign of the result is the same as the sign of the second operand.

In one embodiment, the delivered value is exact and the chosen quantum is the quantum of the second operand.

When XiC is zero, the result placed at the first operand location is canonical. When XiC is one, the result is canonical, except for infinity.

One example of the results for Load Lengthened includes:

Results for Instructions when second operand (b) is

| Instruction | −∞ | −Fn | −0 | +0 | +Fn | +∞ | QNaN | SNaN |
|---|---|---|---|---|---|---|---|---|
| LOAD LENGTHENED (XiC = 0) | T(−∞) | T(b)[1] | T(−0) | T(+0) | T(b)[1] | T(+∞) | T(b)[1] | Xi: T(b*)[1] |

-continued

| Instruction | −∞ | −Fn | −0 | +0 | +Fn | +∞ | QNaN | SNaN |
|---|---|---|---|---|---|---|---|---|
| LOAD LENGTHENED (XiC = 1) | N(−∞)[1] | T(b)[1] | T(−0) | T(+0) | T(b)[1] | N(+∞)[1] | T(b)[1] | T(b)[1] |

Explanation:
*The SNaN is converted to the corresponding QNaN before it is placed at the target operand location.
[1]The operand is extended to the longer format by appending zeros to the left before it is placed at the target operand location.
Fn Nonzero finite number (includes both subnormal and normal).
N(±∞) The resultant infinity has the reserved field set to zero and has canonical declets in the encoded trailing significand field. The result is not considered canonical unless all digits in the trailing significand are zeros.
T(x) The canonical result x is placed at the target operation location.
Xi: IEEE invalid operation exception. The results shown are produced when FPC 0.0 is zero.
XiC IEEE invalid operation exception control, bit 0 of the $M_4$ field.

For LXDTR, the $R_1$ field is to designate a valid floating point register pair; otherwise, a specification exception is recognized, in one example.

In accordance with an aspect of the present invention, the Load Lengthened instruction is implemented without performing the unpacking of the trailing significand of a source operand of the instruction (e.g., the second operand) eliminating the need for the three copies of unpacking logic (one for each data format). In one implementation, in accordance with an aspect of the present invention, the Load Lengthened operation includes shifting the DPD 16 bits to the right (in one example) and padding zeros on the left. Further, the exponent is shifted two bits to the right (in one example) and the combo field (containing the most significant digit (MSD) and 2 most significant bits of the exponent) is set to zero for finite numbers (infinity and NaNs are copied down). Canonicalization logic changes any non-canonical DPD data to canonical DPD data. The logic used to execute this operation includes a simple mux to align the appropriate fields and the canonicalization logic.

Figure 5B:
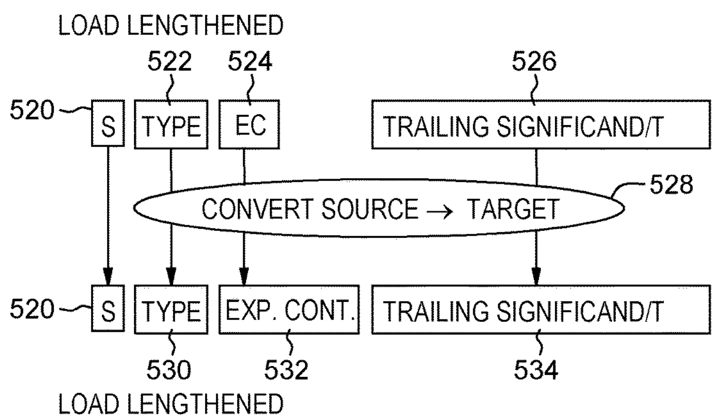
FIG. 5B depicts one example of converting an operand of a Load Lengthened instruction, in accordance with an aspect of the present invention.
Figure 5C:
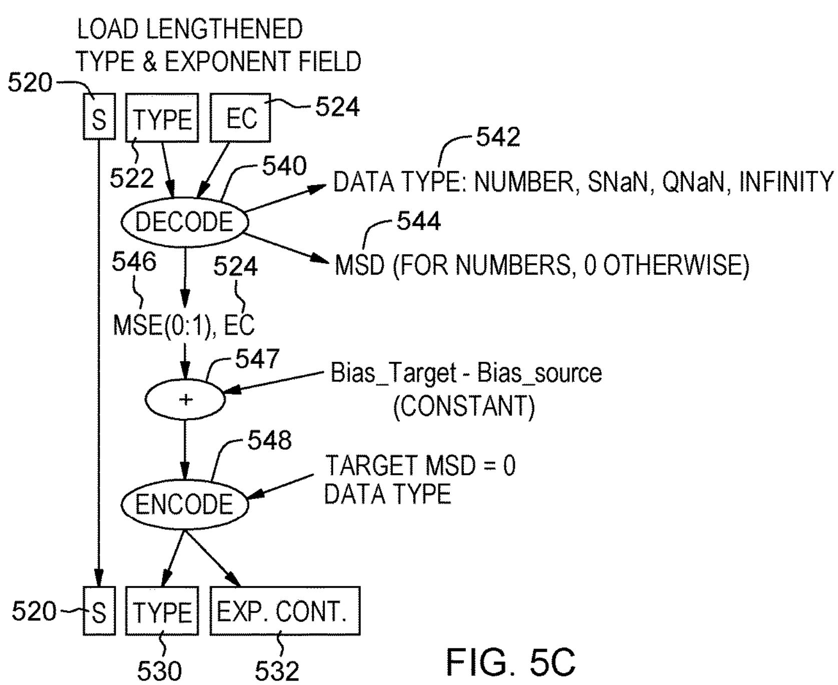
FIG. 5C depicts one example of further details of converting type and exponent fields of an operand of a Load Lengthened instruction, in accordance with an aspect of the present invention.
Figure 5D:
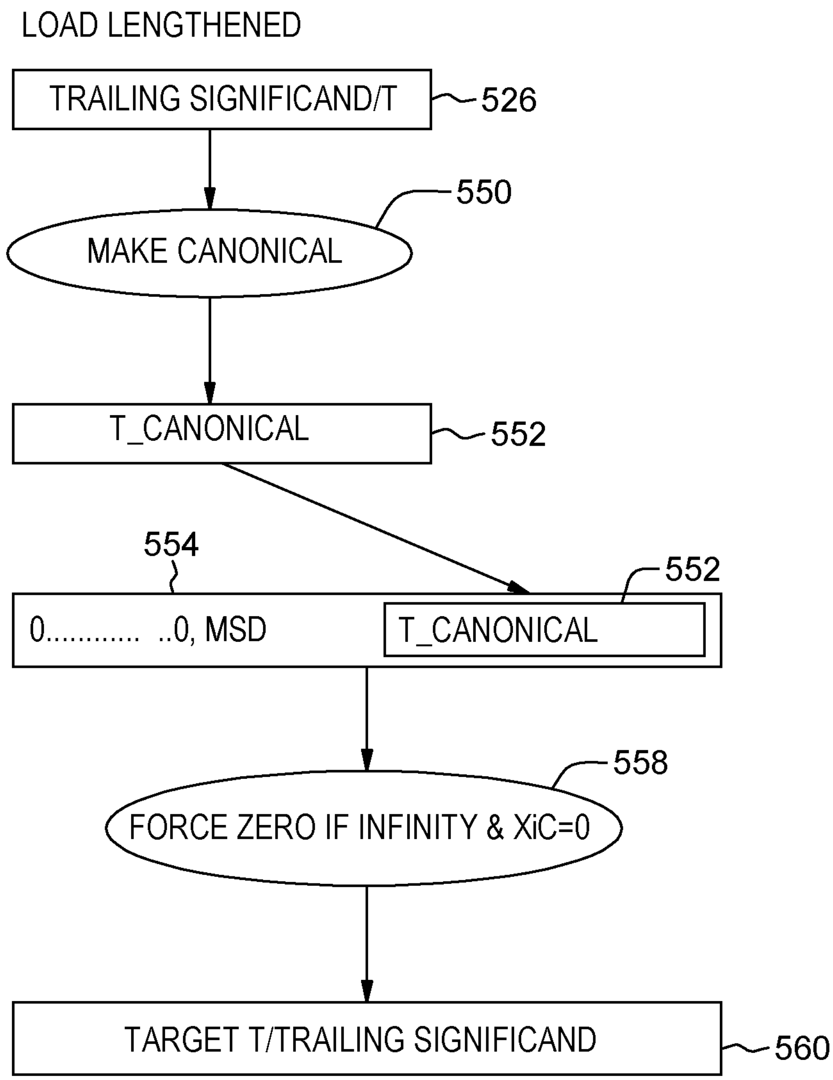
FIG. 5D depicts one example of a flow for converting the trailing significand of an operand of a Load Lengthened instruction, in accordance with an aspect of the present invention.

Further details regarding one example of implementation of a load lengthened operation, in accordance with an aspect of the present invention, are described with reference to FIGS. 5B-5D. As shown in FIG. 5B, in one implementation, source values of type 522, exponent continuation (EC) 524 and trailing significand (T) 526 of the second operand are converted from the source values to target values 530, 532, 534, respectively. This conversion as further explained below is performed without decompressing/compressing, also referred to as unpacking/packing, and in particular, without performing unpack/pack operations on the trailing significand. No conversion is needed for sign 520.

In accordance with one or more aspects of the present invention, for the results, declets are made canonical. Further, in one implementation as described herein, for a number, the sign is passed, the mantissa is padded with leading zeros and the exponent is rebiased (e.g., by adding a constant); for special handling of NaN and infinity, the sign and type are passed, and the target values of EC and T depend on the XiC control; for infinity, EC=0, if XiC=0: T=0; if XiC=1: extend original T with leading zeros; for NaN: extend original T with leading zeros, QNAN: EC=0, SNAN, XiC=0: EC=10 . . . 0, detect INV exception: SNaN: XiC=1: EC=0.

Further details relating to converting the type and exponent fields are described with reference to FIG. 5C. As shown in FIG. 5C, source values of type 522 and EC 524 are input to decode logic 540, which provides a data type 542, a most significant digit 544, a most significant exponent 546, and EC 524. The data type may be a number, a SNaN, a QNaN or infinity, and the most significant digit is the determined value for numbers, or 0 for other than numbers. The most significant exponent 546 output from decode logic 540 (see, e.g., FIG. 4B), as well as exponent continuation 524 are combined 547 with a constant (bias_target-bias_source), and the value is input to encode logic 548, along with a target MSD (e.g., =0) and the data type. Encoding is performed resulting in target values for type 530 and exponent continuation 532 per the table described above for Load Lengthened. (For example, with XiC=0, an infinity has the combo field copied down and the trailing significand canonicalized, and an SNaN sets the IEEE invalid operation exception.) Sign 520 remains the same.

Further details relating to conversion of trailing significand 526 are described with reference to FIG. 5D. The value of the trailing significand 526 is made canonical 550 resulting in a canonical trailing significand 552, which is combined with zeros and the most significant digit 554. Those values are input into logic 558 to determine if zero is to be forced. If it is an infinity or if XiC=0, then zero is forced. The output of logic 558 is the target trailing significand 560, which is zero if forced or the converted trailing significand (e.g., 0 . . . 0, MSD $T_{13}$canonical; 554,552). Again, this conversion is performed absent unpacking/packing of the trailing significand.

In addition to a Load Lengthened instruction that may be implemented without or absent unpacking/packing of the trailing significand, a Load and Test instruction is also implemented without or absent unpacking/packing of the trailing significand.

Figure 6A:
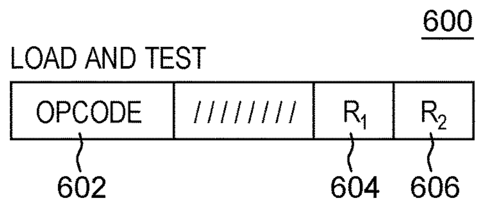
FIG. 6A depicts one embodiment of a format of a Load and Test instruction, in accordance with an aspect of the present invention.

One example of a Load and Test instruction is described with reference to FIG. 6A. In one example, a Load and Test instruction 600 includes an opcode 602 to specify a load and test operation, a first register field ($R_1$) 604, and a second register field ($R_2$) 606. In one example, two opcodes may be specified: one indicating a long DFP (LTDTR), and a second indicating an extended DFP (LTXTR).

In operation, the second operand (e.g., contents of the register specified by $R_2$) is placed at the first operand location (e.g., address specified in the register specified by $R_1$), and its sign and magnitude are tested to determine the setting of the condition code. The condition code is set the same as for a comparison of the second operand with zero.

The second operand is canonicalized before it is placed at the first operand location. If the second operand is an SNaN, an IEEE invalid operation exception is recognized; if there is no interruption, the result is the corresponding QNaN.

In one example, the chosen quantum is the quantum of the second operand. If the delivered value is a finite number, it is represented with the chosen quantum.

The result placed at the first operand location is canonical. One example of the results for this instruction include:
Results for Instruction when second operand (b) is

| Instruction | −∞ | −Fn | −0 | +0 | +Fn | +∞ | QNaN | SNaN |
|---|---|---|---|---|---|---|---|---|
| LOAD AND TEST | T(−∞) | T(b) | T(−0) | T(+0) | T(b) | T(+∞) | T(b) | Xi: T(b*) |

*The SNaN is converted to the corresponding QNaN before it is placed at the target operand location.
Fn Nonzero finite number (includes both subnormal and normal).
T(x) The canonical result x is placed at the target operation location.
Xi IEEE invalid operation exception. The results shown are produced when FPC 0.0 is zero.

For LTXTR, the R fields are to designate valid floating point register pairs; otherwise, a specification exception is recognized, in one example.

The resulting condition code includes, for instance:

0 Result is zero
1 Result is less than zero
2 Result is greater than zero
3 Result is a NaN In accordance with an aspect of the present invention, the Load and Test instruction is implemented without performing the unpacking of the trailing significand of a source operand of the instruction (e.g., the second operand). In one example, for Load and Test, when the data is loaded into the input register, the DPD data is checked for zeros. The encoding of DPD data is such that all zeros are still encoded with every bit being off, so this is, for instance, a 20-bit AND function. At the same time, the sign bit (bit 0) is checked and the combo field is checked to see if it is a NaN code (bits 0:4="11111", see, e.g., FIG. 4B). The condition code is set to 3, if a NaN exists; if not, it is set to 0, if the DPD data is 0; if not, it is set to 1 or 2 depending on if the sign bit is 1 or 0, respectively. The data is then canonicalized and written to the target register. Decompression or compression of the data is not performed, as all the processing takes place directly on the DPD source data.

Figure 6B:
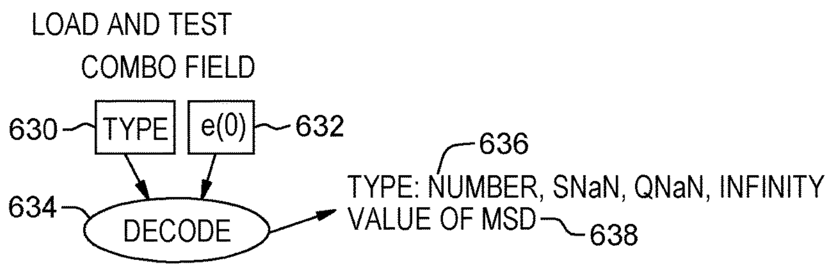
FIG. 6B depicts one example of converting a combination field of an operand of a Load and Test instruction, in accordance with an aspect of the present invention.

Further details of one example implementation of Load and Test are described with reference to FIGS. 6B-6D. Referring to FIG. 6B, initially, the combination field of the second operand, including type 630 and a selected bit (e.g., bit 0) 632 of the exponent, is input to decode logic 634. The output of the decode logic is data type 636, which is a number, a SNaN, a QNaN or an infinity; and the value of a most significant digit 638 (see, e.g., FIG. 4B). In one embodiment, if the type is SNaN, an invalid exception is detected, and the type is forced to QNaN. As examples, for QNaN: Type=11111, EC=0, and the sign and trailing significand (T) are equal to the source (declets are made canonical); for infinity, the sign is same as the source, type=11110, EC is unchanged, T=0; and for a number, sign, type, EC and T are the same as the source (declets are made canonical).

Figure 6C:
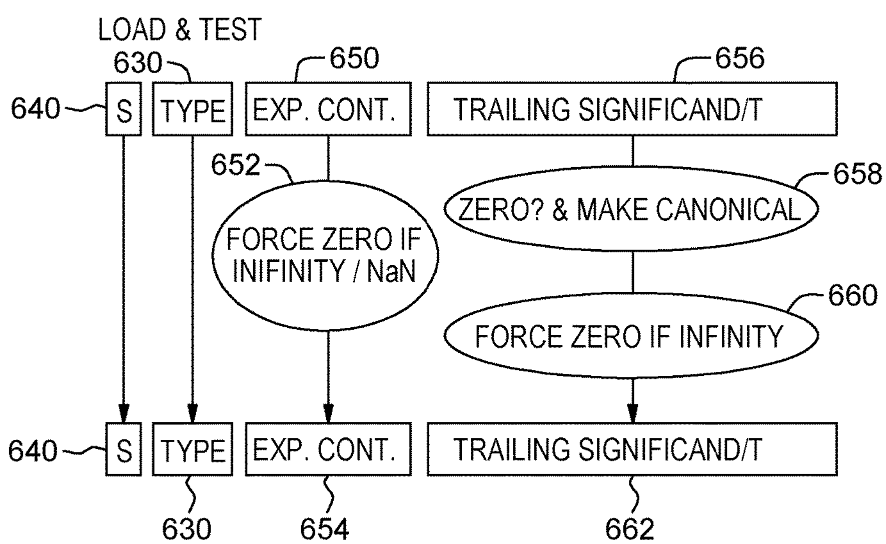
FIG. 6C depicts one example of converting a trailing significand of an operand of a Load and Test instruction, in accordance with an aspect of the present invention.
Figure 6D:
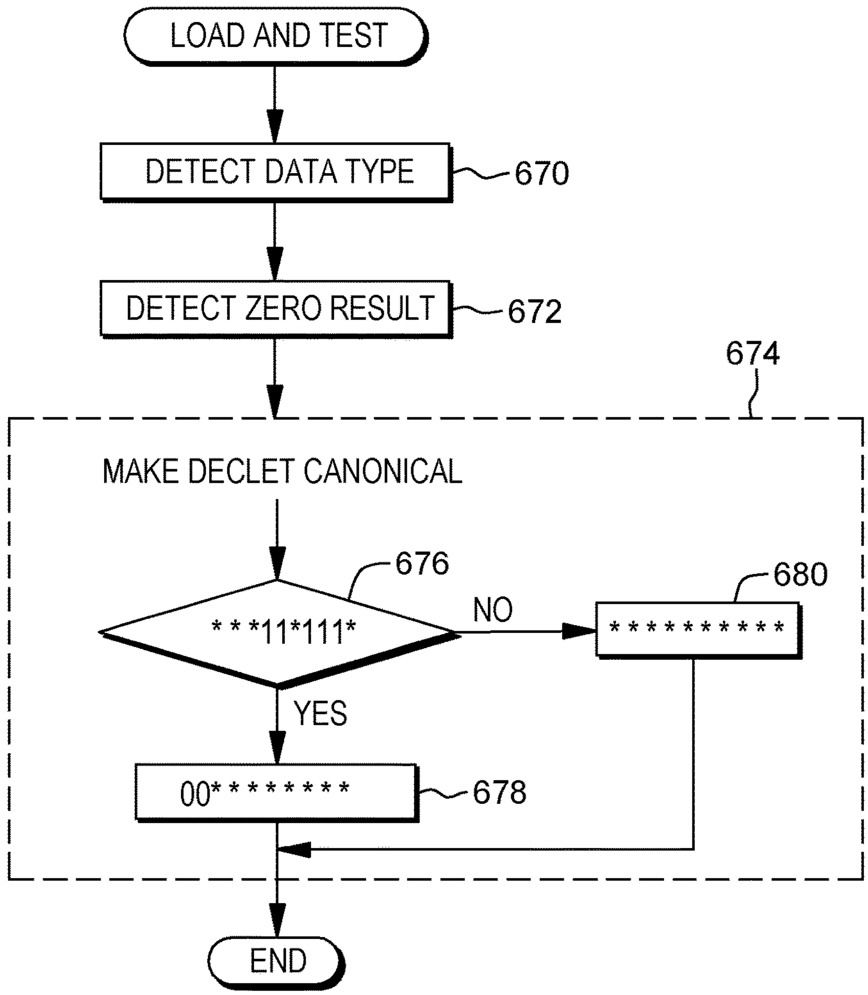
FIG. 6D depicts one example of a flow for converting a trailing significand of an operand of a load and test instruction, in accordance with an aspect of the present invention.

Additionally, the trailing significand of the second operand is converted, as shown in FIG. 6C, without performing an unpack/pack operation. As shown in FIG. 6C, a source value of a trailing significand 656 is input to logic 658, which is used to determine whether the source value of the trailing significand is zero, and to make the source value canonical. Output of logic 658 is input to logic 660, which determines (e.g., using the data type determined from decoding the combination field) if the value is infinity. If infinity, then a zero is forced. The output of logic 660 is the converted trailing significand 662. Thus, the source operand (e.g., the second operand) is converted to a target operand, in which the target operand includes sign 640 (same as source), type 630 (same as source), exponent continuation 654 (same as source 650 unless forced zero, if infinity/NaN) and trailing significand 662.

One embodiment of a flow relating to converting a trailing significand without performing an unpack/pack operation is described with reference to FIG. 6D. Initially, the data type is determined via, for instance, decoding the combination field, STEP 670. Additionally, detection of a zero result is performed, STEP 672. For instance, the combination field is decoded to determine whether MSD=0 or whether the type is infinity. Moreover, the trailing significand is decoded to determine whether T=0. Further, one or more declets in the trailing significand source are made canonical, STEP 674. For instance, each declet is checked for ***11*111*, INQUIRY 676. If true, the target value of the declet is 00******, STEP 678. Otherwise, the target value of the declet is ****, STEP 680**. In one embodiment, the declets of the source are made canonical in parallel.

Figure 7A:
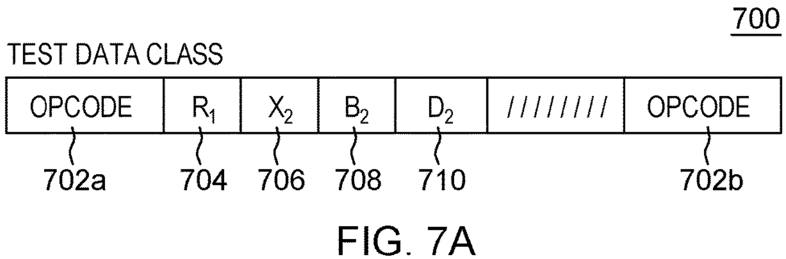
FIG. 7A depicts one embodiment of a format of a Test Data Class instruction, in accordance with an aspect of the present invention.

In addition to the Load Lengthened and Load and Test instructions, another instruction that may be implemented without unpacking/packing the trailing significand of a source operand of an instruction is a Test Data Class instruction, one example of which is described with reference to FIG. 7A. In one example, a Test Data Class instruction 700 includes opcode fields 702*a*, 702*b* to specify a test data class operation; a first register field ($R_1$) 704; an index field ($X_2$) 706; a base field ($B_2$) 708; and a displacement field ($D_2$) 710. The contents of the register designated by $R_1$ 704 are referred to as the first operand. Further, the contents of the general registers designated by $X_2$ field 706 and $B_2$ field 708 are added to the contents of $D_2$ 710 to form an address of the second operand.

In one example, a plurality of opcodes may be specified: one indicating a short DFP (TDCET); another indicating a long DFP (TDCDT); and yet another indicating an extended DFP (TDCXT).

In operation, the class and sign of the first operand are examined to select one bit from the second operand address. Condition code 0 or 1 is set according to whether the selected bit is zero or one, respectively.

The second operand address is not used to address data; instead, the rightmost 12 bits of the address, bits 52-63, are used to specify 12 combinations of data class and sign. Bits 0-51 of the second operand address are ignored, in this example.

As shown below, in one example, DFP operands are divided into six classes: zero, subnormal, normal, infinity, quiet NaN, and signaling NaN:

| | Bit used when sign is | |
|---|---|---|
| DFP data class | + | − |
| Zero | 52 | 53 |
| Subnormal | 54 | 55 |
| Normal | 56 | 57 |
| Infinity | 58 | 59 |

-continued

| | Bit used when sign is | |
|---|---|---|
| DFP data class | + | − |
| Quiet NaN | 60 | 61 |
| Signaling NaN | 62 | 63 |

One or more of the second operand address bits may be set to one. If the second operand address bit corresponding to the class and sign of the first operand is one, condition code 1 is set; otherwise, condition code 0 is set, in one example.

Operands, including SNaNs and QNaNs, are examined without causing an IEEE exception.

For TDCXT, the $R_1$ field is to designate a valid floating point register pair; otherwise, a specification exception is recognized, in one example.

Resulting Condition Code, includes, for instance:

0 Selected bit is 0 (no match)

1 Selected bit is 1 (match)

2—

3—

In one embodiment, Test Data Class provides a way to test an operand without risk of an exception or setting the IEEE flags.

In accordance with an aspect of the present invention, the Test Data Class instruction is implemented without unpack/pack logic. In one implementation, for Test Data Class, the hardware is used to detect if the DPD data is zero, a QNaN, an SNaN, an infinity (e.g., for infinity bits 0:4 of the combo field="11110"), and if the result is positive or negative. Additional logic is used to perform a leading zero detection on the DPD data. The exponent is compared to the amount of leading zeros available to determine if the data is a subnormal number. This DPD leading zero detection is performed without having to decompress the data.

Figure 7B:
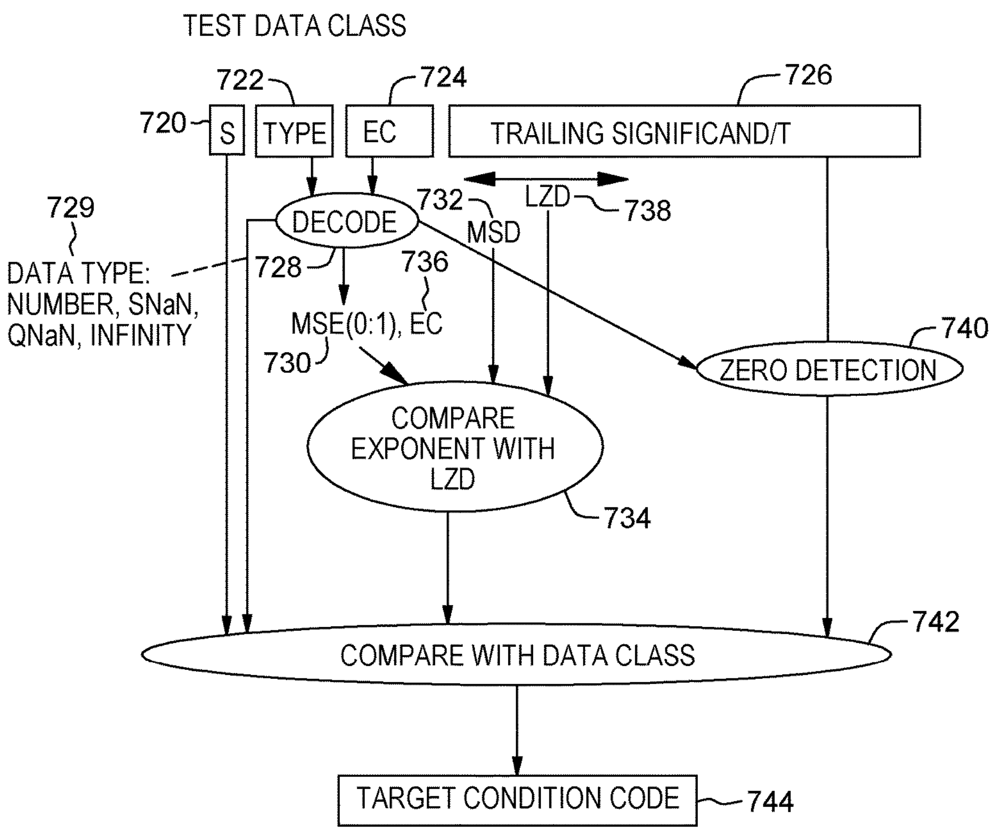
FIG. 7B depicts one example of converting an operand of a test data class instruction, in accordance with an aspect of the present invention.

Further details of one example of an implementation for Test Data Class are described with reference to FIG. 7B. In this implementation, values for type 722 and EC 724 of a source operand (e.g., the first operand) are input to decode logic 728, which decodes the combination field, as described above. The output of decode logic 728, including the most significant exponent 730 and the most significant digit 732, are input to compare logic 734, along with EC 736 and leading zeros 738 of trailing significand 726. Compare logic 734 compares the exponent with the number of leading zeros of the mantissa. The output of compare logic 734 is input to compare logic 742, along with data type 729 provided by decode logic 728, the output of zero detection 740, which detects zero on the trailing significand, and sign 720. The output of compare logic 742 is a target condition code 744. For instance, if the operand does not match the data class, condition code is set to zero; otherwise, if there is a match, the condition code is set to one.

Figure 8A:
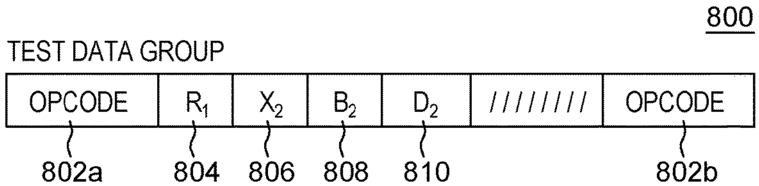
FIG. 8A depicts one example of a format of a Test Data Group instruction, in accordance with an aspect of the present invention.

In addition to the above instructions, a Test Data Group instruction may also be implemented without unpacking/packing the trailing significand of a source operand (e.g., the first operand) of the instruction. One example of the Test Data Group instruction is described with reference to FIG. 8A. In one example, a Test Data Group instruction 800 includes opcode fields 802*a*, 802*b* to specify a test data group operation; a first register field ($R_1$) 804; an index field ($X_2$) 806; a base field ($B_2$) 808; and a displacement field ($D_2$) 810. The contents of the register designated by $R_1$ 804 are referred to as the first operand. Further, the contents of the general registers designated by $X_2$ field 806 and $B_2$ field 808 are added to the contents of $D_2$ field 810 to form an address of the second operand.

In one example, a plurality of opcodes may be specified: one indicating a short DFP (TDGET); another indicating a long DFP (TDGDT); and yet another indicating an extended DFP (TDGXT).

In operation, the group and sign of the first operand are examined to select one bit from the second operand address. Condition code 0 or 1 is set according to whether the selected bit is zero or one, respectively.

The second operand address is not used to address data; instead, the rightmost 12 bits of the address, bits 52-63, are used to specify 12 combinations of data group and sign. Bits 0-51 of the second operand address are ignored, in this example.

Test Data Group is used to determine whether a finite number is safe. A finite number is safe if the exponent is neither maximum nor minimum, and the leftmost significand digit is zero.

In one example, there are six data groups: safe zero, zero with extreme exponent, nonzero with extreme exponent, safe nonzero, nonzero leftmost significand digit with non-extreme exponent, and special. The special group is defined for infinity and NaN. Depending on the model, subnormal with nonextreme exponent may be placed in the nonzero with extreme exponent group or the safe nonzero group. An example of the data groups and bit assignment is as follows:

| | | MSD | | Bit used when sign is | |
|---|---|---|---|---|---|
| DFP Operand | Exponent | LMD | Data Group | + | − |
| Zero | Nonextreme | z[1] | Safe Zero | 52 | 53 |
| Zero | Extreme | z[1] | Zero with extreme exponent | 54 | 55 |
| Nonzero finite | Extreme | — | Nonzero with extreme exponent | 56 | 57 |
| Nonzero finite | Nonextreme | z | Safe nonzero | 58 | 59 |
| Nonzero finite | Nonextreme | nz | Nonzero leftmost significand digit with nonextreme exponent | 60 | 61 |
| Infinity or NaN | na | na | Special | 62 | 63 |

Explanation:

— The result does not depend on this condition.

[1]This condition is true by virtue of the condition to the left of this column.

Extreme Maximum right-units-view (RUV) exponent, Qmax, or minimum right-units-view (RUV) exponent, Qmin.

Nonextreme Qmax < right-units-view (RUV) exponent < Qmin.

LMD Leftmost significand digit.

na Not applicable.

nz Nonzero.

z Zero.

One or more of the second operand address bits may be set to one. If the second operand address bit corresponding to the group and sign of the first operand is one, condition code 1 is set; otherwise, condition code 0 is set, in one example.

Operands, including SNaNs and QNaNs, are examined without causing an IEEE exception.

For TDGXT, the $R_1$ field is to designate a valid floating point register pair; otherwise, a specification exception is recognized, in one example.

Resulting Condition Code includes, for instance:

0 Selected bit is 0 (no match)

1 Selected bit is 1 (match)

2—

3—

In one implementation:

1. Test Data Group provides a way to test an operand without risk of an exception or setting the IEEE flags.
2. Test Data Group can be issued after an operation that produces a DFP result to quickly determine if the result is safe. For DFP results that are finite numbers, the result is safe if using a wider data format by the operation would have produced the same value and quantum. A safe result has two characteristics: (1) the exponent is neither the maximum exponent nor the minimum exponent, and (2) the leftmost significand digit is zero.
3. Test Data Group may be used to test whether a nonzero finite number is safe by setting bits 58 and 59 of the second operand address to ones.
4. Test Data Group may be used to test whether a nonzero finite number has reached the limit of the format precision but not the limit of the format range by setting bits 60 and 61 of the second operand address to ones.
5. Subnormal with nonextreme exponent may be grouped with either the nonzero with extreme exponent group or the safe nonzero group. The program should not depend on which group subnormal with nonextreme exponent is in.

In accordance with an aspect of the present invention, Test Data Group effectively uses the same hardware as Test Data Class for leading zero count on DPD data, zero detection, and NAN detection. Logic is used to check if the exponent is an extreme exponent, which may be performed with a combinatorial logic circuit on the exponent of the data.

Figure 8B:
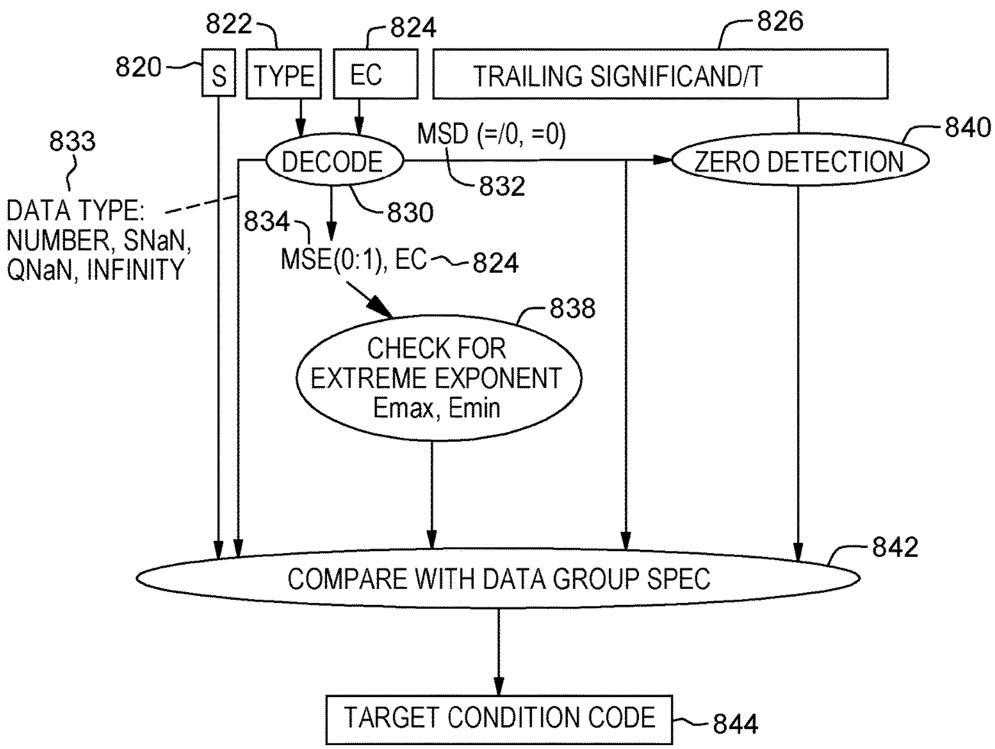
FIG. 8B depicts one example of converting an operand of a Test Data Group instruction, in accordance with an aspect of the present invention.

Referring to FIG. 8B, for the Test Data Group instruction, in one example, type 822 and EC 824 of a source operand of the instruction are input to decode logic 830, and the output is, for instance, data type 833, the most significant digit 832, as well as the most significant exponent 834. The most significant exponent 834 and EC 824 are input to check logic 838, which checks for an extreme exponent, either Emax (extreme max) or Emin (extreme min). The output of which is input to compare with data group spec logic 842, along with MSD 832, the output of zero detection logic 840, which detects a zero trailing significand, data type 833 and sign 820. Compare logic 842 compares the input value with the data group spec, and provides a target condition code 844.

In accordance with an aspect of the present invention, the unpacking of the trailing significand of a source operand of an instruction is not performed for the subset of instructions, as described herein. Thus, processing within a computing environment is facilitated. One particular example of facilitating processing within a computing environment is described with reference to FIGS. 9A-9B.

Figure 9A:
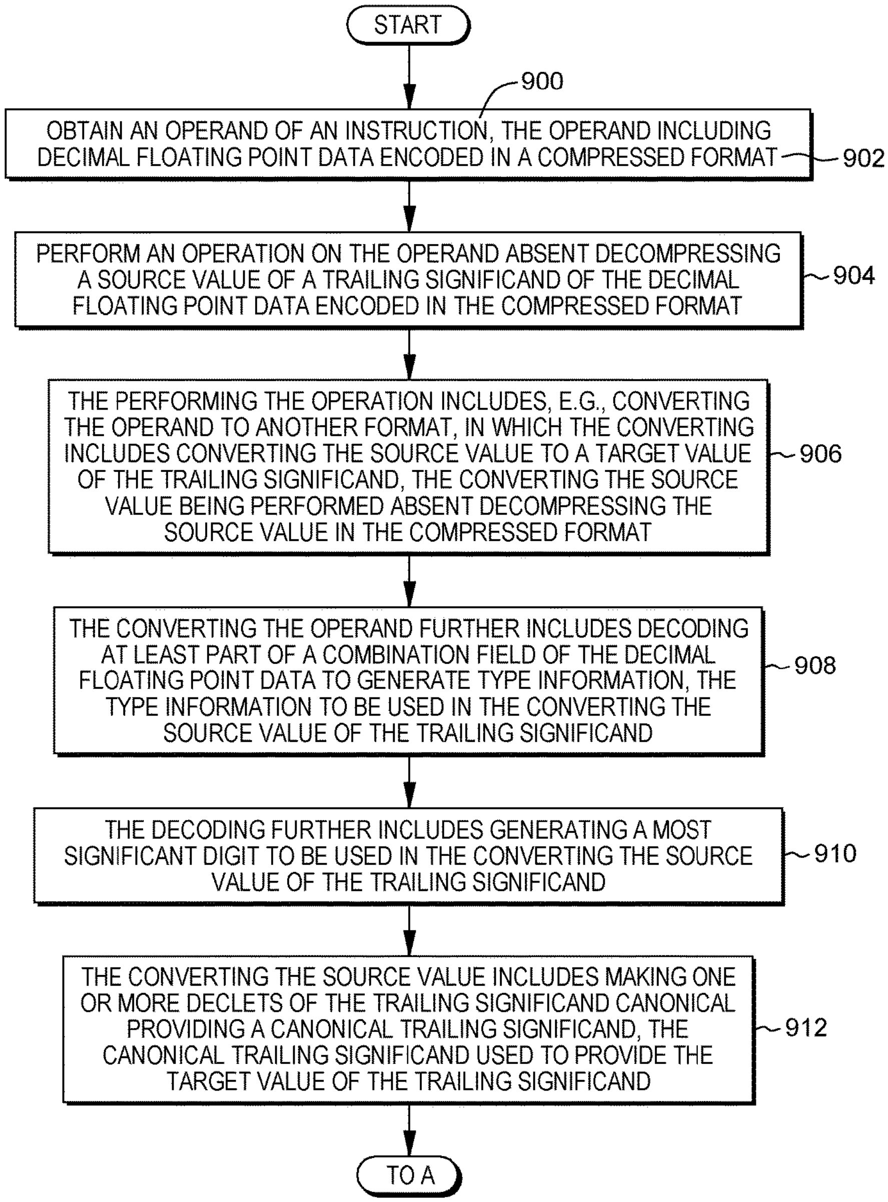
FIGS. 9A-9B depict one embodiment of facilitating processing in a computing environment, in accordance with an aspect of the present invention.

Referring to FIG. 9A, in one embodiment, an operand of an instruction is obtained (900). The operand includes decimal floating point data encoded in a compressed format (902). An operation is performed on the operand absent decompressing a source value of a trailing significand of the decimal floating point data encoded in the compressed format (904).

In one example, the performing the operation includes converting the operand to another format, in which the converting the operand includes converting the source value to a target value of the trailing significand, the converting the source value being performed absent decompressing the source value in the compressed format (906).

The converting the operand further includes, in one example, decoding at least part of a combination field of the decimal floating point data to generate type information, the type information to be used in the converting the source value of the trailing significand (908). The decoding further includes, in one embodiment, generating a most significant digit to be used in the converting the source value of the trailing significand (910).

In a further embodiment, the converting the source value includes making one or more declets of the trailing significand canonical providing a canonical trailing significand, the canonical trailing significand used to provide the target value of the trailing significand (912).

Figure 9B:
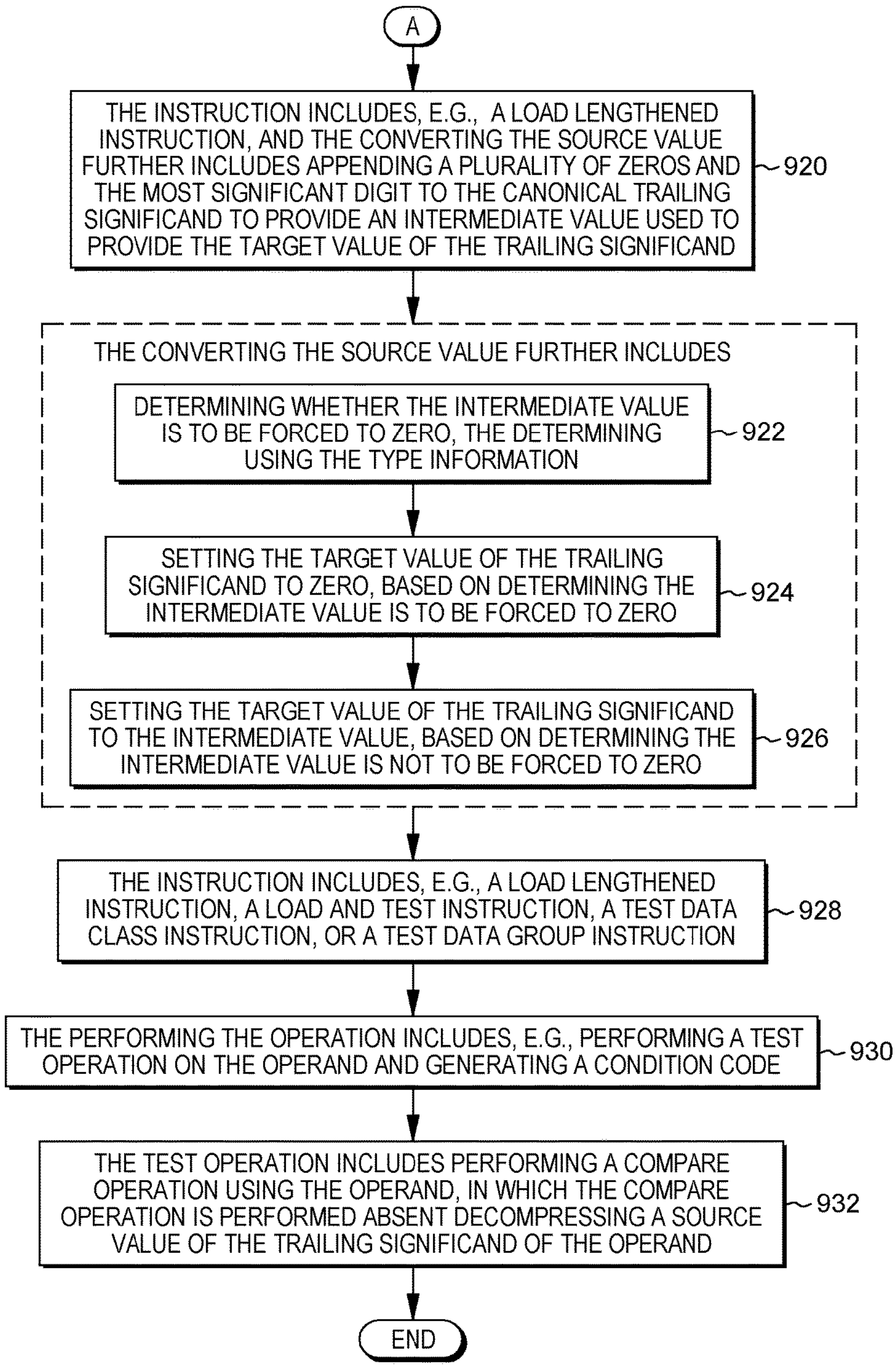

As one particular example, referring to FIG. 9B, the instruction includes a load lengthened instruction, and the converting the source value further includes appending a plurality of zeros and the most significant digit to the canonical trailing significand to provide an intermediate value used to provide the target value of the trailing significand (920).

In one example, the converting the source value further includes determining whether the intermediate value is to be forced to zero, the determining using the type information (922); setting the target value of the trailing significand to zero, based on determining the intermediate value is to be forced to zero (924); and setting the target value of the trailing significand to the intermediate value, based on determining the intermediate value is not to be forced to zero (926).

As further examples, the instruction may be a load lengthened instruction, a load and test instruction, a test data class instruction, or a test data group instruction (928).

In yet a further embodiment, the performing the operation includes performing a test operation on the operand and generating a condition code (930). The test operation includes, for instance, performing a compare operation using the operand, in which the compare operation is performed absent decompressing a source value of the trailing significand of the operand (932).

Described in detail herein is a capability for decreasing the latency of certain decimal floating point operations by operating directly on the compressed densely packed decimal data in the decimal floating point format. Circuits are used to extract the information for execution of selected instructions without having to first decompress the data. Furthermore, the instructions that write result DFP data (e.g., Load Extended, and Load and Test) modify the data on the fly to ensure it is written in the canonical DFP format.

One or more aspects of the present invention are inextricably tied to computer technology. By operating directly on the DPD data, processing cycles are eliminated, performance is improved and power is saved. By operating directly on the DFP data format, the converter hardware is no longer needed to execute these instructions. Therefore, it is possible to migrate these instructions to a faster, shorter depth pipeline, such as a vector execution unit, which does not contain DFP compression and decompression hardware.

Figure 10A:
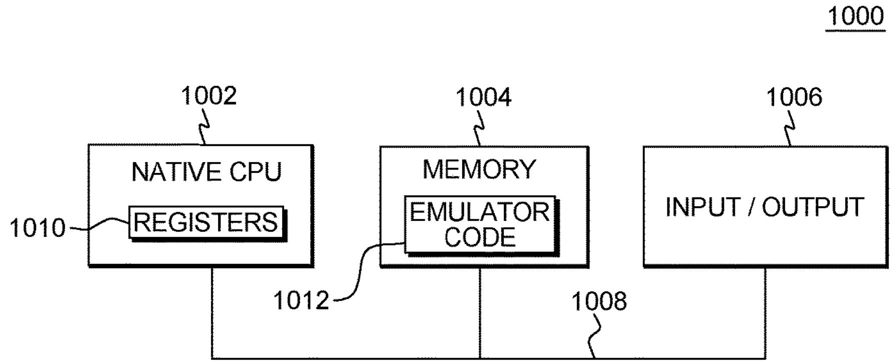
FIG. 10A depicts one embodiment of another example of a computing environment to incorporate and use one or more aspects of the present invention.

One embodiment of a computing environment to incorporate and use one or more aspects of the present invention is described above. Another embodiment of a computing environment to incorporate and use one or more aspects is described with reference to FIG. 10A. In this example, a computing environment 1000 includes, for instance, a native central processing unit (CPU) 1002, a memory 1004, and one or more input/output devices and/or interfaces 1006 coupled to one another via, for example, one or more buses 1008 and/or other connections. As examples, computing environment 1000 may include a PowerPC processor or a pSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 1002 includes one or more native registers 1010, such as one or more general purpose registers and/or one or more special purpose registers used during processing within the environment. These registers include information that represent the state of the environment at any particular point in time.

Moreover, native central processing unit 1002 executes instructions and code that are stored in memory 1004. In one particular example, the central processing unit executes emulator code 1012 stored in memory 1004. This code enables the computing environment configured in one architecture to emulate another architecture. For instance, emulator code 1012 allows machines based on architectures other than the z/Architecture, such as PowerPC processors, pSeries servers, HP Superdome servers or others, to emulate the z/Architecture and to execute software and instructions developed based on the z/Architecture.

Figure 10B:
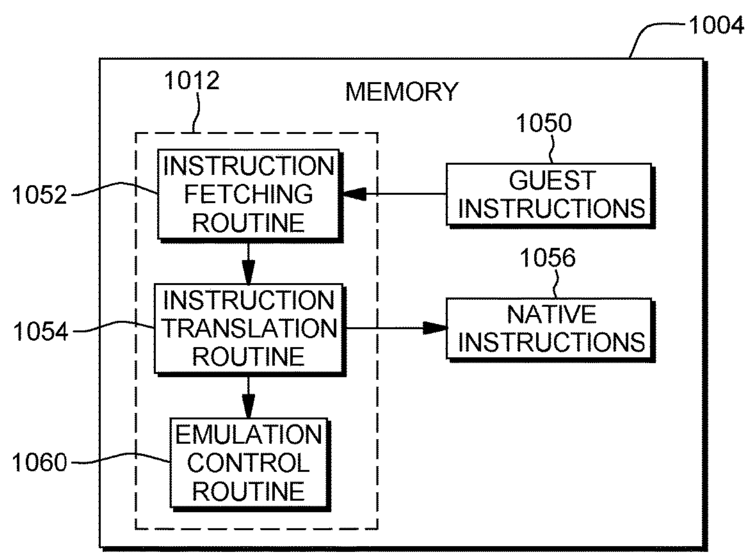
FIG. 10B depicts one embodiment of the memory of FIG. 10A, in accordance with an aspect of the present invention.

Further details relating to emulator code 1012 are described with reference to FIG. 10B. Guest instructions 1050 stored in memory 1004 comprise software instructions (e.g., correlating to machine instructions) that were developed to be executed in an architecture other than that of native CPU 1002. For example, guest instructions 1050 may have been designed to execute on a z/Architecture processor, but instead, are being emulated on native CPU 1002, which may be, for example, an Intel Itanium II processor. In one example, emulator code 1012 includes an instruction fetching routine 1052 to obtain one or more guest instructions 1050 from memory 1004, and to optionally provide local buffering for the instructions obtained. It also includes an instruction translation routine 1054 to determine the type of guest instruction that has been obtained and to translate the guest instruction into one or more corresponding native instructions 1056. This translation includes, for instance, identifying the function to be performed by the guest instruction and choosing the native instruction(s) to perform that function.

Further, emulator 1012 includes an emulation control routine 1060 to cause the native instructions to be executed. Emulation control routine 1060 may cause native CPU 1002 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 1056 may include loading data into a register from memory 1004; storing data back to memory from a register; or performing some type of arithmetic or logic operation, as determined by the translation routine.

Each routine is, for instance, implemented in software, which is stored in memory and executed by native central processing unit 1002. In other examples, one or more of the routines or operations are implemented in firmware, hardware, software or some combination thereof. The registers of the emulated processor may be emulated using registers 1010 of the native CPU or by using locations in memory 1004. In embodiments, guest instructions 1050, native instructions 1056 and emulator code 1012 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

A guest instruction 1050 that is obtained, translated and executed is, for instance, a Load Lengthened instruction, a Load and Test instruction, a Test Data Class instruction, and/or a Test Data Group instruction, described herein. The instruction, which is of one architecture (e.g., the z/Architecture), is fetched from memory, translated and represented as a sequence of native instructions 256 of another architecture (e.g., PowerPC, pSeries, Intel, etc.). These native instructions are then executed.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

One example of a cloud computing node is node 10 of FIG. 1. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

Figure 11:
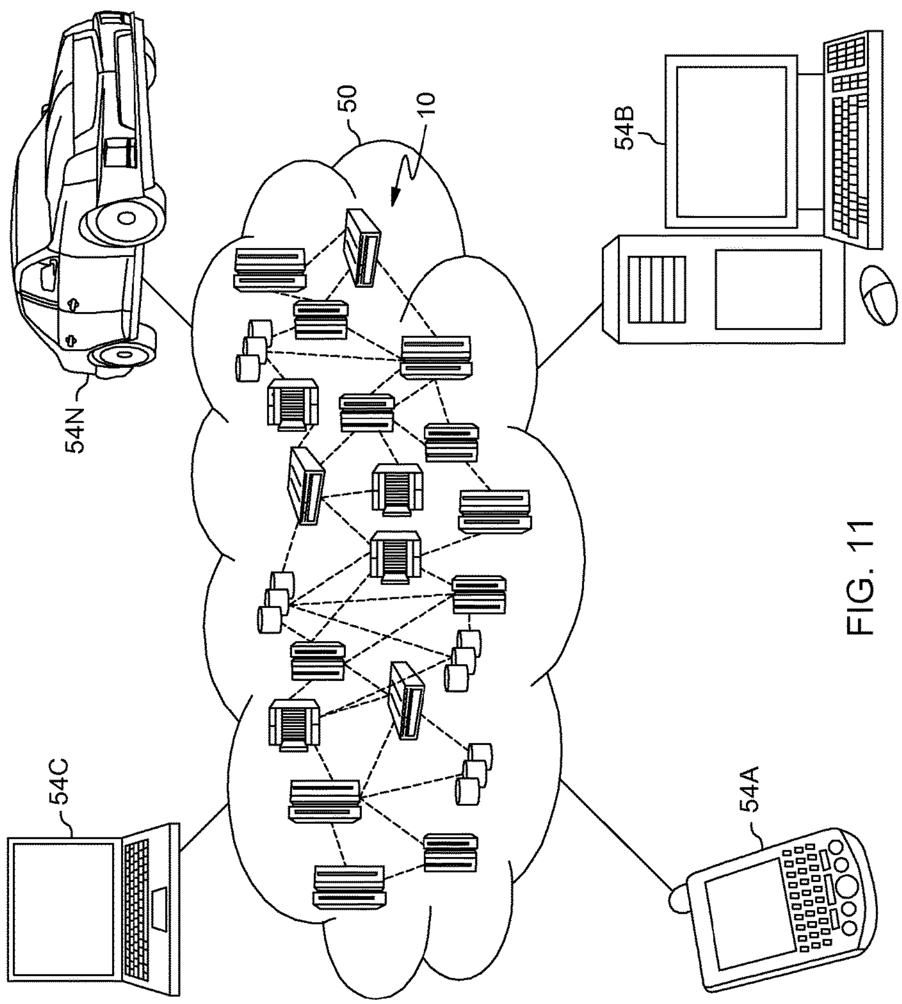
FIG. 11 depicts one embodiment of a cloud computing environment.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
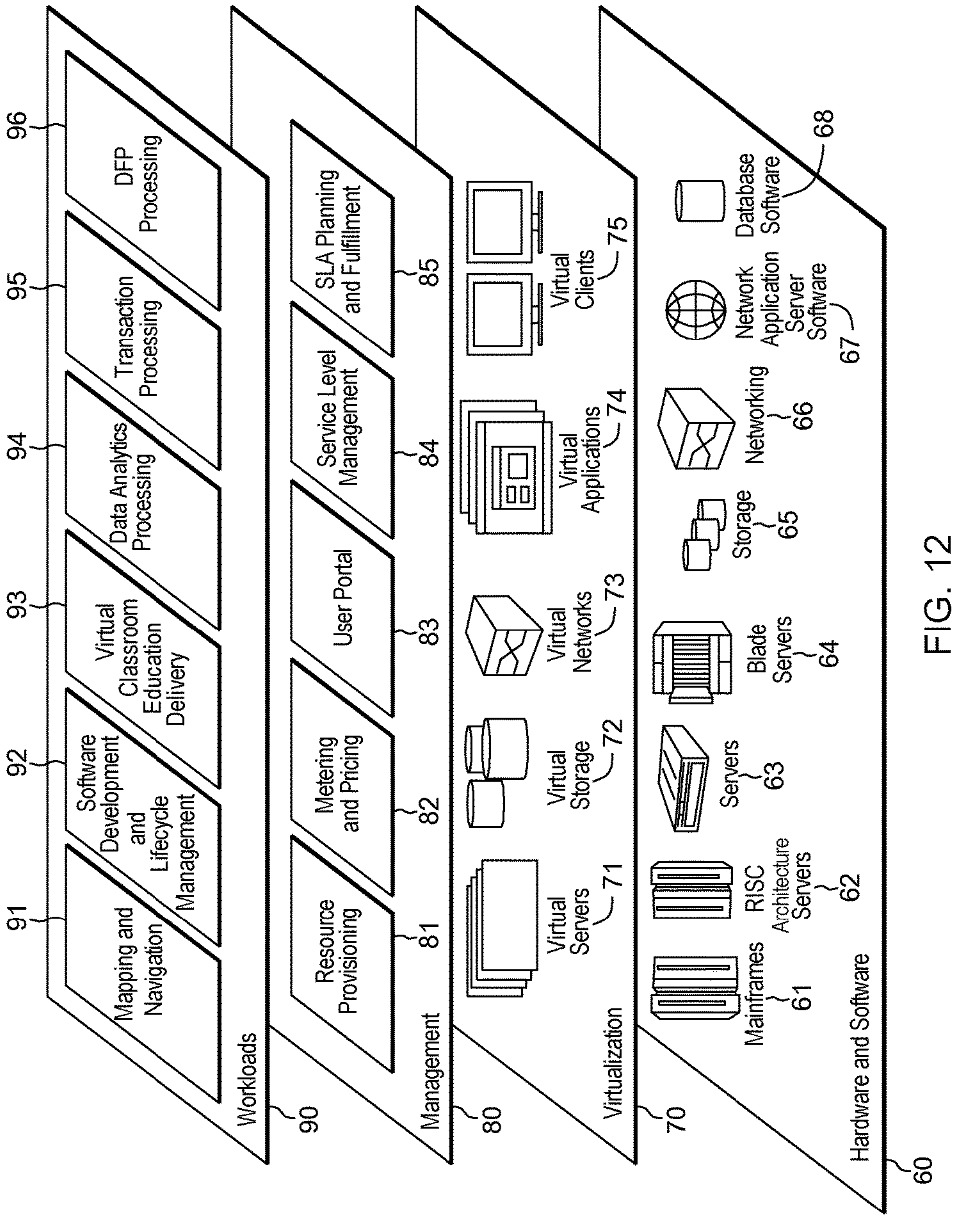
FIG. 12 depicts one example of abstraction model layers.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and DFP processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer system to facilitate processing in a computing environment, the computer system comprising:

a memory; and a processor in communication with the memory, wherein the computer system is configured to perform a method, said method comprising:

processing, by the processor, an instruction, the instruction being of a subset of instructions to perform directly on decimal floating point data absent decompression of a trailing significand of the decimal floating point data, the processing the instruction comprising:

obtaining the instruction to be executed, the instruction comprising an operand, the operand including the decimal floating point data encoded in a compressed format; and executing the instruction using a shorter execution pipeline of a plurality of execution pipelines of the computing environment, the plurality of execution pipelines of the computing environment including the shorter execution pipeline and a longer execution pipeline in which the shorter execution pipeline includes less processing cycles than the longer execution pipeline, the executing the instruction including performing an operation on the operand absent decompressing a source value of the trailing significand of the decimal floating point data encoded in the compressed format, wherein the performing the operation comprises converting the operand to another format, the converting the operand comprising converting the source value to a target value of the trailing significand, the converting the source value being performed absent decompressing the source value in the compressed format; and wherein the processing the instruction directly on the decimal floating point data absent decompression of the trailing significand and the executing the instruction using the shorter execution pipeline of the plurality of execution pipelines of the computing environment reduces processing cycles required to execute the instruction.

2. The computer system of claim 1, wherein the converting the operand further comprises decoding at least part of a combination field of the decimal floating point data to generate type information, the type information to be used in the converting the source value of the trailing significand.

3. The computer system of claim 2, wherein the decoding further comprises generating a most significant digit to be used in the converting the source value of the trailing significand.

4. The computer system of claim 3, wherein the converting the source value comprises making one or more declets of the trailing significand canonical to provide a canonical trailing significand, the canonical trailing significand used to provide the target value of the trailing significand.

5. The computer system of claim 4, wherein the instruction comprises a load lengthened instruction, and wherein the converting the source value further comprises appending a plurality of zeros and the most significant digit to the canonical trailing significand to provide an intermediate value used to provide the target value of the trailing significand.

6. The computer system of claim 5, wherein the converting the source value further comprises:

determining whether the intermediate value is to be forced to zero, the determining using the type information;

setting the target value of the trailing significand to zero, based on determining the intermediate value is to be forced to zero; and setting the target value of the trailing significand to the intermediate value, based on determining the intermediate value is not to be forced to zero.

7. The computer system of claim 1, wherein the instruction comprises an instruction selected from a group consisting of: a load lengthened instruction, a load and test instruction, a test data class instruction, and a test data group instruction.

8. The computer system of claim 1, wherein the performing the operation comprises performing a test operation on the operand and generating a condition code.

9. The computer system of claim 8, wherein the test operation comprises performing a compare operation using the operand, wherein the compare operation is performed absent decompressing a source value of the trailing significand of the operand.

10. A computer program product to facilitate processing in a computing environment, the computer program product comprising:

a computer readable storage medium readable by a processing unit and storing instructions for execution by the processing unit for performing a method comprising:

processing, by a processor, an instruction, the instruction being of a subset of instructions to perform directly on decimal floating point data absent decompression of a trailing significand of the decimal floating point data, the processing the instruction comprising:

obtaining the instruction to be executed, the instruction comprising an operand, the operand including the decimal floating point data encoded in a compressed format; and executing the instruction using a shorter execution pipeline of a plurality of execution pipelines of the computing environment, the plurality of execution pipelines of the computing environment including the shorter execution pipeline and a longer execution pipeline in which the shorter execution pipeline includes less processing cycles than the longer execution pipeline, the executing the instruction including performing an operation on the operand absent decompressing a source value of the trailing significand of the decimal floating point data encoded in the compressed format, wherein the performing the operation comprises converting the operand to another format, the converting the operand comprising converting the source value to a target value of the trailing significand, the converting the source value being performed absent decompressing the source value in the compressed format; and wherein the processing the instruction directly on the decimal floating point data absent decompression of the trailing significand and the executing the instruction using the shorter execution pipeline of the plurality of execution pipelines of the computing environment reduces processing cycles required to execute the instruction.

11. The computer program product of claim 10, wherein the instruction comprises an instruction selected from a group consisting of: a load lengthened instruction, a load and test instruction, a test data class instruction, and a test data group instruction.

12. The computer program product of claim 10, wherein the performing the operation comprises performing a test operation on the operand and generating a condition code.

13. The computer program product of claim 12, wherein the test operation comprises performing a compare operation using the operand, wherein the compare operation is performed absent decompressing a source value of the trailing significand of the operand.

14. The computer program product of claim 10, wherein the converting the operand further comprises decoding at least part of a combination field of the decimal floating point data to generate type information, the type information to be used in the converting the source value of the trailing significand.

15. The computer program product of claim 14, wherein the decoding further comprises generating a most significant digit to be used in the converting the source value of the trailing significand.

16. A computer-implemented method of facilitating processing in a computing environment, the computer-implemented method comprising:

processing, by a processor, an instruction, the instruction being of a subset of instructions to perform directly on decimal floating point data absent decompression of a trailing significand of the decimal floating point data, the processing the instruction comprising:

obtaining the instruction to be executed, the instruction comprising an operand, the operand including the decimal floating point data encoded in a compressed format; and executing the instruction using a shorter execution pipeline of a plurality of execution pipelines of the computing environment, the plurality of execution pipelines of the computing environment including the shorter execution pipeline and a longer execution pipeline in which the shorter execution pipeline includes less processing cycles than the longer execution pipeline, the executing the instruction including performing an operation on the operand absent decompressing a source value of the trailing significand of the decimal floating point data encoded in the compressed format, wherein the performing the operation comprises converting the operand to another format, the converting the operand comprising converting the source value to a target value of the trailing significand, the converting the source value being performed absent decompressing the source value in the compressed format; and wherein the processing the instruction directly on the decimal floating point data absent decompression of the trailing significand and the executing the instruction using the shorter execution pipeline of the plurality of execution pipelines of the computing environment reduces processing cycles required to execute the instruction.

17. The computer-implemented method of claim 16, wherein the instruction comprises an instruction selected from a group consisting of: a load lengthened instruction, a load and test instruction, a test data class instruction, and a test data group instruction.

18. The computer-implemented method of claim 16, wherein the performing the operation comprises performing a test operation on the operand and generating a condition code.

19. The computer-implemented method of claim 18, wherein the test operation comprises performing a compare operation using the operand, wherein the compare operation is performed absent decompressing a source value of the trailing significand of the operand.

20. The computer-implemented method of claim 16, wherein the converting the operand further comprises decoding at least part of a combination field of the decimal floating point data to generate type information, the type information to be used in the converting the source value of the trailing significand.

* * * * *